United States Patent [19]

Harmsen et al.

[11] 4,069,370

[45] Jan. 17, 1978

[54] ELECTRICAL CONTACT MATERIAL, AND TERMINAL

[75] Inventors: Nils Harmsen, Bruchkobel; Franz Sperner, Hanau, both of Germany

[73] Assignee: W. C. Heraeus GmbH, Hanau (Main), Germany

[21] Appl. No.: 705,918

[22] Filed: July 16, 1976

[30] Foreign Application Priority Data

Sept. 13, 1975 Germany ............................ 2540956

[51] Int. Cl.[2] ........................ B32B 15/00; B32B 15/04

[52] U.S. Cl. ........................................ 428/671; 75/165; 75/134 N; 200/266; 200/268; 428/672; 428/929

[58] Field of Search ............... 75/165, 134 N; 29/199; 428/671, 929, 672; 174/102 A, 126 CP; 200/266, 268

[56] References Cited

U.S. PATENT DOCUMENTS

| | | | |
|---|---|---|---|
| 2,143,217 | 1/1939 | Truthe | 75/165 X |
| 2,400,003 | 5/1946 | Hensel et al. | 75/165 X |
| 3,622,285 | 11/1971 | Hayes | 29/199 |
| 3,661,569 | 5/1972 | Abbott | 75/165 |
| 3,868,249 | 2/1975 | Hufford et al. | 75/134 N |
| 3,981,723 | 9/1976 | Tuccillo | 75/165 |

FOREIGN PATENT DOCUMENTS

| | | | |
|---|---|---|---|
| 683,004 | 11/1952 | United Kingdom | 75/165 |

*Primary Examiner*—C. Lovell

*Attorney, Agent, or Firm*—Flynn & Frishauf

[57] ABSTRACT

The material is applied to a substrate, for example, terminal bronze, brass, or the like, and comprises, preferably, 50 to 55% gold, 24 to 28% palladium, 15 to 20% silver, 2.5 to 3% tin, 0.08 to 0.15% iridium, 0.08 to 0.15% ruthenium, 0.1 to 0.3% copper and 0.6 to 1% indium.

2 Claims, 1 Drawing Figure

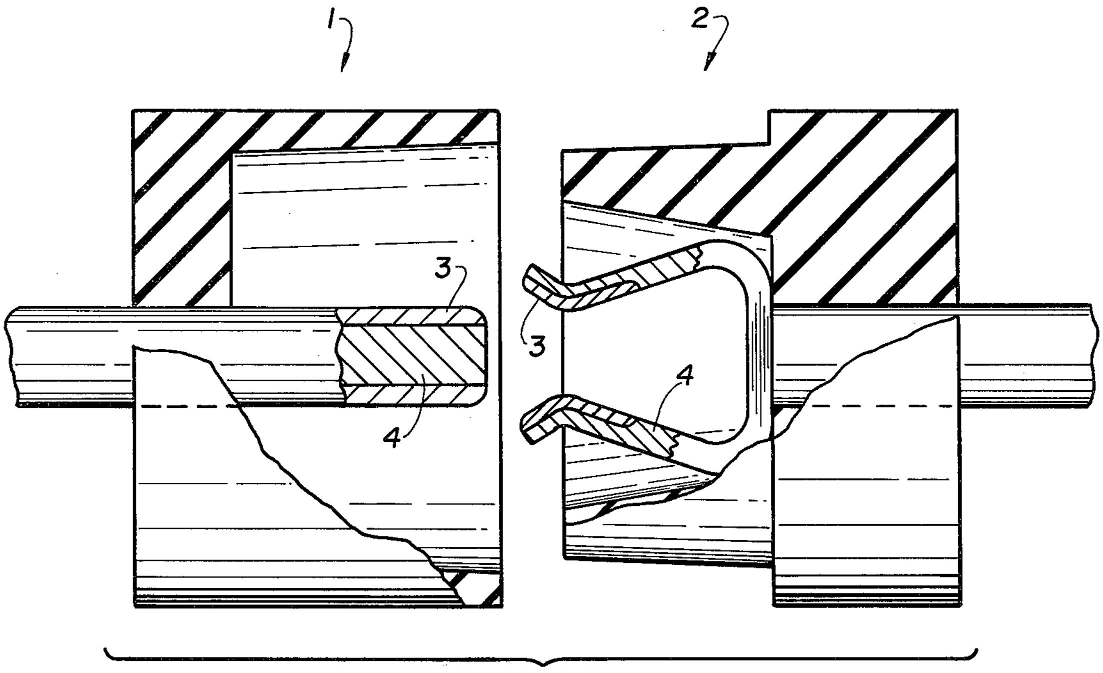
1
2
3
3
4
4

ELECTRICAL CONTACT MATERIAL, AND TERMINAL

Cross Reference to Related Applications

U.S. Ser. No. 705,917, filed July 16, 1976 (claiming priority of German Application P 25 36 985.1-34 of Aug. 20, 1975); and U.S. Ser. 705,919, filed July 16, 1976 (claiming priority of German Application P 25 40 943.2-34 of Sept. 13, 1975), both assigned to the assignee of the present application.

The present invention relates to a gold alloy, and more particularly to a gold alloy for use in low-current electronic contacts, and especially to such alloys which include noble and common metals.

Various compromises are necessary to provide the best possible material for electrical contacts. The electrical contacts should be reliable to provide effective electrical connection. The material also should be sturdy and resist wear, while additionally continuing in long-term operation without introducing contact noise. The contact resistance should be as low as possible and should not change with use, repeated making and breaking of the contact, interruption of contact engagement and the like; further, no oxide or sulfide layers or other contaminations or changes of the surface of the contact area itself should occur, since such changes may increase the contact resistance.

It has been proposed to use noble metals and noble metal alloys as the materials for the engagement contacts. For example, an electronic circuit for operation under vacuum, or in a protective gas atmosphere has been proposed (see German Patent Publication DT-AS 1,764,233) which uses a binary noble metal alloy for the contacting layer and which has from 5 to 35% (by weight) palladium, the remainder being gold. Multi-component gold alloys as materials for electronic contacts have also been disclosed in Swiss Patent CH-PS 457,870. Such an alloy, besides gold, contain from 10 to 40% copper and silver, as well as from 0.5 to 3% nickel. Up to 10% metals of the platinum group may be added.

Alloys used as working materials for low-current electrical contacts and using indium have been proposed (see German Patent DT-PS 1,106,967). To prevent mechanical deformation of the contact surfaces, particularly the formation of metal dust by mechanical abrasion, and the formation of polished layers on the contact surfaces, an alloy based on silver, gold, platinum, rhodium, iridium, osmium, copper or nickel has 1 to 9% indium added thereto.

An alloy with reasonable gold content for making electrical contact has also been proposed (see German Disclosure Document DT-OS 2,019,790) which consists of 39 to 47% gold, 9 to 12% palladium, the remaining silver and copper in a ratio (by weight) of 1 : 1 to 1.5 : 1; possibly up to 2% of one or more of the metals zinc, nickel, indium, tin or iridium can be added.

It is an object of the present invention to provide a gold alloy having a homogeneous structure to be used as a material for electrical contacts, particularly plug connecting contacts, or scanning or slider contacts for use in electronics, which have hardness values of at least 200 kilogram-force/mm², low specific electrical resistance, low and uniform contact resistance, are corrosion resistant even in the presence of atmosphere or vapors containing sulfur, moisture, or organic vapors and, further and additionally, are inexpensive.

Subject matter of the present invention

Briefly, a gold alloy is provided which has about 20 to 30% palladium, 15 to 25% silver, 2.5 to 5% tin, 0.05 to 0.5% iridium, 0.05 to 0.5% ruthenium, 0.05 to 0.5% copper, 0.1 to 2% indium, the remainder gold.

A particularly suitable alloy for contacts has
50 to 55% gold
24 to 28% palladium
15 to 20% silver
2.5 to 3% tin
0.08 to 0.15% iridium
0.08 to 0.15% ruthenium
0.1 to 0.3% copper and
0.6 to 1% indium.

The contact material in accordance with the present invention has, surprisingly, shown that even the high palladium and silver contents do not result in the formation of brown powder or dust, nor of sulfide layers; the "brown powder effect" is thus absent, even after long periods of operation and in atmospheres containing contaminating gases. Even if the ratio of tin to indium is between 3 : 1 to 5 : 1, the small addition of ruthenium and iridium results in a very fine-grain alloy. Hardness values of about 230 kp/mm² (kg-force/mm²) were obtained, so that, as a result, deformation and mechanical abrasion can be, effectively, neglected. The hardness values can even be increased by heat treatment at temperatures of from 500° to 600° C. In spite of the high hardness values, the contact materials in accordance with the present invention are still ductile, that is, can be readily worked. The materials preferably are used as contact layers applied to a suitable carrier material of an electrical contact terminal element, particularly when used in plug connections or wiping connections.

An experiment was made regarding abrasion resistance: A rivet of AuAg 20 Cu 10 was pressed with a force of 150 cN against/securely clamped test sheet made of the material in accordance with the present invention. The distance of the rubbing path was 1.5 cm, with a mean speed of 2.3 cm/sec. After 500 forward and backward movements, no measurable wear could be noticed and no clearly visible abrasion tracks could be detected with the naked eye.

In a comparison test, the material in accordance with the present invention was tested for comparison with the gold alloy which has been found well suited and has been used for years, in order to determine corrosion characteristics:

1. For 5, 10 and 15 minutes, respectively, the material was tempered in air at 250° C.
2. The material was stored from 1 to 21 days in moving contaminating gas atmospheres; these gas atmospheres were characterized as follows:
   a. 10 ppm $H_2S$ at 40° C and 50% relative humidity
   b. 10 ppm $S_2O$ at 40° C and 50% relative humidity
   c. 1 ppm $H_2S$ + 2.5 ppm $SO_2$ and 1 ppm $NO_2$ at 25° C and 75% relative humidity.

These tests showed that the alloys in accordance with the present invention are as resistant to oxidation as the alloy AuAg 30; it is, however, more resistant in the contaminating atmospheres with respect to surface discoloration than the two comparison alloys AuAg 30 and AuAg 20 Cu 10.

The table attached hereto shows essential physical and technical data of the material in accordance with the present invention, as well as of comparison materials for a similar use.

TABLE

| | | Alloy present invention | AuAg30 | AuAg20Cu10 |
|---|---|---|---|---|
| (1) Density g/cm$^3$ | | 14.3 | 15.7 | 15.1 |
| (2) specific electrical resistance in Ω mm$^2$/m | | 0.29 | 0.11 | 0.14 |
| (3) hardness HV | hard | 280 | 110 | 240 |
| | soft | 120 | 35 | 130 |
| | annealed (tempered) | 320 | — | 310 |
| (4) strength in N/mm$^2$ | hard | 900 | 370 | 860 |
| | soft | 550 | 220 | 490 |
| | annealed (tempered) | 1030 | — | 1020 |
| (5) elongation in % | hard | 2 | 2 | 1 |
| | soft | 38 | 35 | 32 |
| (6) contact resistance[1)] (50%-values) in mΩ | | | | |
| (6a) original condition | | ≦13 | ≦5 | ≦5 |
| (6b) $H_2S$-atmosphere[2)] | | ≦18 | ≦60 | ≦250 |
| (6c) $SO_2$-atmosphere[3)] | | ≦30 | ≦20 | ≦80 |
| (6d) 3-component-atmosphere[4)] | | ≦30 | ≦55 | ≦25 |
| (6e) tempered 250° C/5 min in air | | ≦20 | ≦5 | >1000 |

[1)]measured against a gold counter terminal at 10 mA/10 mV
[2)]10 ppm $H_2S$, 40° C, 50% relative humidity, 7 days
[3)]10 ppm $SO_2$, 40° C, 50% relative humidity, 7 days
[4)]1 ppm $H_2S$, 1 ppm $NO_2$, 2.5 ppm $SO_2$, 25° C, 75% relative humidity 1 day The value of the contact resistance, as can be clearly seen in the Table, before and after being exposed to the gases shows that the material in accordance with this application changes its contact resistance only minimally; the comparison alloys, however, substantially change their contact resistance, resulting in a substantial increase. This means that the material is excellently suitable for the intended use and substantially superior to the comparison alloys. Its other technical data, as is apparent from the Table, correspond at least to the comparison alloys; in some respects, they exceed as comparison data.

The invention will be described by way of example with reference to the accompanying drawings, wherein the single FIGURE is a schematic, part section, vertical view of a contact terminal.

The terminal has a plug element 1 to be received in a socket element 2. A contact layer 3, in accordance with the material above described, is supplied on a carrier 4. The carrier 4 may be of any suitable carrier material, such as a bronze, customary in electrical terminals, brass, a nickel-silver or German silver, or the like.

We claim:

1. Electrical terminal, particularly for plug or wiping terminals for use in electronics, comprising a carrier of electrical contact terminal material at least partially coated with a contact material consisting essentially of 20 to 30% palladium,
15 to 25% silver,
2.5 to 5% tin,
0.05 to 0.5% iridium,
0.05 to 0.5% ruthenium,
0.05 to 0.5% copper,
0.1 to 2% indium, and remainder gold.

2. Electrical terminal according to claim 1, wherein said contact material consists essentially of 50 to 55% gold,
24 to 28% palladium,
15 to 20% silver,
2.5 to 3% tin,
0.08 to 0.15% iridium,
0.08 to 0.15% ruthenium,
0.1 to 0.3% copper, and
0.6 to 1% indium.

* * * * *